United States Patent
Kranz et al.

(10) Patent No.: US 12,457,202 B2
(45) Date of Patent: Oct. 28, 2025

(54) METHOD FOR ANONYMOUSLY TRANSMITTING DATA

(71) Applicant: MERCEDES-BENZ GROUP AG, Stuttgart (DE)

(72) Inventors: Lisa Kranz, Böblingen (DE); Haifa Ben Salem, Stuttgart (DE); Benjamin Nepp, Böblingen (DE); Holger Glemser, Stuttgart (DE); Michael Imhof, Aidlingen (DE); Martin Eisele, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 54 days.

(21) Appl. No.: 18/697,459

(22) PCT Filed: Sep. 28, 2022

(86) PCT No.: PCT/EP2022/076886
§ 371 (c)(1),
(2) Date: Mar. 30, 2024

(87) PCT Pub. No.: WO2023/052378
PCT Pub. Date: Apr. 6, 2023

(65) Prior Publication Data
US 2024/0267363 A1 Aug. 8, 2024

(30) Foreign Application Priority Data
Oct. 1, 2021 (DE) ..................... 10 2021 004 935.7

(51) Int. Cl.
*H04L 9/40* (2022.01)
(52) U.S. Cl.
CPC .......... *H04L 63/0421* (2013.01); *H04L 63/00* (2013.01); *H04L 63/083* (2013.01); *H04L 63/108* (2013.01)

(58) Field of Classification Search
CPC ..... H04L 63/00; H04L 63/083; H04L 63/108; H04L 63/0421; H04L 67/535;
(Continued)

(56) References Cited

U.S. PATENT DOCUMENTS

| | | | |
|---|---|---|---|
| 11,549,813 B2 | 1/2023 | Lindemann et al. | |
| 11,784,958 B2 * | 10/2023 | Gosalia | G06Q 20/327 370/329 |

(Continued)

FOREIGN PATENT DOCUMENTS

| | | |
|---|---|---|
| CN | 113315746 A | 8/2021 |
| DE | 102016207984 B3 | 7/2017 |

(Continued)

OTHER PUBLICATIONS

"Anonymous Vehicles and a Blockchain-Based Transportation Protocol"—Utimaco, Dec. 23, 2019 "Anonymous Vehicles and a Blockchain-Based Transportation Protocol"—Utimaco, Dec. 23, 2019 (Year: 2019).*

(Continued)

*Primary Examiner* — Randy A Scott
(74) *Attorney, Agent, or Firm* — PATENT PORTFOLIO BUILDERS PLLC

(57) ABSTRACT

Data is anonymously transmitted from a vehicle to a computer via a data link. The vehicle authenticates itself for the data transmission. The vehicle authenticates itself as a client in a token server by one or more authentication methods. The authentication and authorization of the client is checked by the token server. If the token server determines that the client is not blocked, a currently valid fleet token, which is identical for all clients within a pre-determined period of time, is sent by the token server to the vehicle as a client. The vehicle waits for a random period of time within a configurable time interval before the vehicle uses the fleet token to (Continued)

Figure 1:
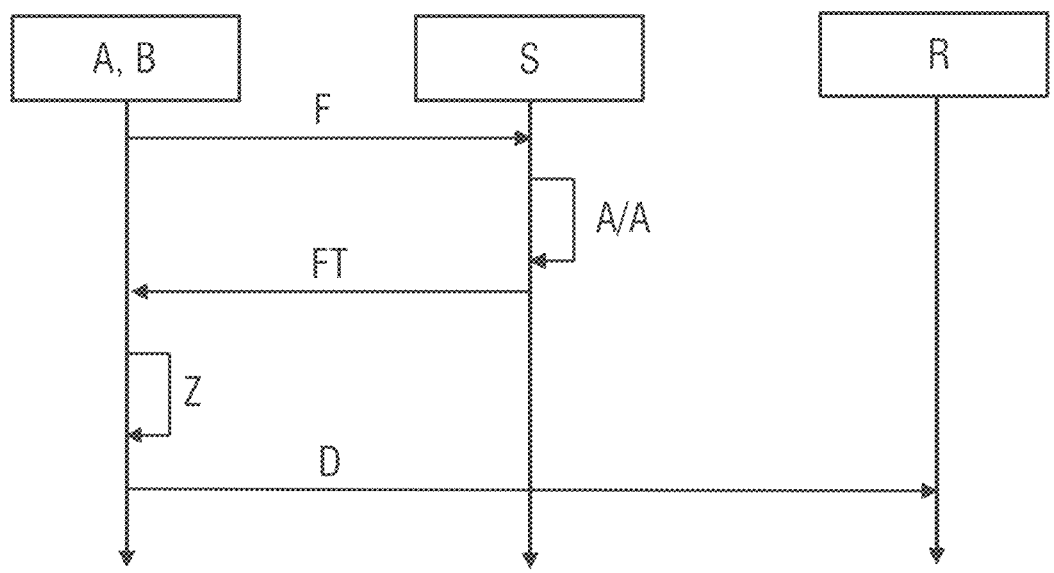

transmit the data to the computer, such that a correlation between the vehicle and the transmitted data via a time measurement is prevented.

3 Claims, 2 Drawing Sheets

(58) Field of Classification Search
CPC .... H04L 63/0807; H04W 4/44; H04W 12/02; G07C 5/008
See application file for complete search history.

(56) References Cited

U.S. PATENT DOCUMENTS

| | | | |
|---|---|---|---|
| 2018/0173895 A1 | 6/2018 | Max et al. | |
| 2018/0356837 A1* | 12/2018 | Lisewski | G05D 1/0297 |
| 2021/0266297 A1 | 8/2021 | Troitsky et al. | |
| 2021/0281532 A1* | 9/2021 | Gosalia | H04W 4/40 |

FOREIGN PATENT DOCUMENTS

| | | |
|---|---|---|
| DE | 102016225287 A1 | 6/2018 |
| DE | 102020007078 B3 * | 3/2022 |
| WO | 2010090664 A1 | 8/2010 |
| WO | 2019174887 A1 | 9/2019 |

OTHER PUBLICATIONS

"Case Study—Authentication and Authorization for the Autonomous Vehicle Data Center Platform"—Intel, Jul. 10, 2018 https://www.intel.com/content/www/us/en/developer/articles/case-study/authentication-and-authorization-for-the-autonomous-vehicle-data-center-platform.html (Year: 2018).*

Enzmann et al.; "Selbstdatenschutz im vernetzten Fahrzeug: Architekturkonzept für Selbstdatenschutz im vernetzten Fahrzeug;" SeDaFa; Aug. 8, 2017; Publication No. D2, Verison 1.0; https://sedafa-projekt.de/media/D2_final.pdf.

Intention to Grant dated Jan. 23, 2024 in related/corresponding EP Application No. 22 793 736.4.

International Search Report and Written Opinion mailed Jan. 23, 2023 in related/corresponding International Application No. PCT/EP2022/076866.

Office Action created Aug. 17, 2022 in related/corresponding DE Application No. 10 2021 004 935.7.

Office Action dated Nov. 5, 2024 in related/corresponding JP Application No. 2024-519654.

Office Action created Feb. 22, 2025 in related/corresponding CN Application No. 202280064722.6.

* cited by examiner

METHOD FOR ANONYMOUSLY TRANSMITTING DATA

BACKGROUND AND SUMMARY OF THE INVENTION

Exemplary embodiment of the invention relate to a method for anonymously transmitting data of a vehicle to a computer coupled with the latter via a data link, wherein the vehicle authenticates itself for the data transmission.

A token-based, centralized authentication method for providing access to user information associated with a user relationship with the service provider is known from WO 2010/090664 A1. For a service provider, the authentication method comprises the steps: authenticating a user who presents a user token to a user terminal, wherein the user token has a user identification stored thereon; deriving a resource identifier using at least two data input elements, wherein the at least two data input elements contain the user ID of the user and a service provider ID of the service provider, wherein the user information is stored in a storage network, and the resource identifier is connected to the user information; requesting the user information from the storage network using the resource identifier; and providing the requested user information to the service provider.

DE 10 2020 007 078 B3 relates to a method for anonymized transmission of time and location-referenced sensor data of a vehicle to a vehicle-external computer. It is provided that, during a driving operation of a vehicle, global position data of the vehicle is sent to the computer at regular time intervals, wherein after the vehicle has taken up the driving operation, the position data is sent for the first time after a randomly determined period of time has elapsed or after a randomly determined route portion has been covered from when the driving operation was taken up.

DE 10 2016 207 984 B3 discloses a method for transmitting route data recorded by a travelling vehicle to a database arranged separately from the vehicle. A route data set comprises route data and a location and a point in time of the recording. The recorded route data sets are stored in a vehicle memory. If at least the first number of route data sets is stored in the memory, route data messages are sent to the database. A route data message comprises route data and an associated location of the recording. A route data message is sent at a point in time selected at random within a first time interval after the route data is recorded and/or if the vehicle has left a pre-determined radius around the location of the recording of the route data. The messages can be sent directly to the database or via a minimum number of intermediate receivers which transmit to the respective receiver of a transfer originating from them that they are the source of the data.

A network device is known from US 2018/0356837 A1, said network device receiving inputs from an operator, who selects parameters which are connected to the output of at least one remote control command to at least one autonomous vehicle. Based on the selected parameters, the network device generates a control token for an autonomous vehicle, and transmits the control token via a wireless network to at least one autonomous vehicle.

Exemplary embodiment of the invention are directed to a method for anonymously transmitting data of a vehicle to a computer coupled with the latter via a data link.

The invention relates to a method for anonymously transmitting data of a vehicle to a computer coupled with the latter via a data link, wherein the vehicle authenticates itself for the data transmission. It is provided that the vehicle authenticates itself as a client in a token server by means of one or more authentication methods. By means of the token server, the authentication and authorization of the client is checked, and if the token server determines that the client is not blocked, a currently valid fleet token, which is identical for all clients within a pre-determined period of time, is sent to the vehicle as a client by means of the token server. The vehicle then waits for a random period of time within a configurable time interval before the vehicle uses the fleet token to transmit the data to the computer, such that a correlation between the vehicle and the transmitted data via a time measurement is prevented.

By using the method, it is possible for the vehicle to anonymously transmit data to the computer coupled via a data link, wherein it is largely ensured that substantially only vehicles authorized as clients can transmit data to the computer.

In addition, individual vehicles can be blocked as clients as required in a subsequent token rotation, and despite the synchronized token rotation, a load is distributed on the token server, i.e. a period of time for updating the token in the client.

Exemplary embodiments of the invention are explained in more detail in the following with reference to drawings.

BRIEF DESCRIPTION OF THE DRAWING FIGURES

Figure 2:
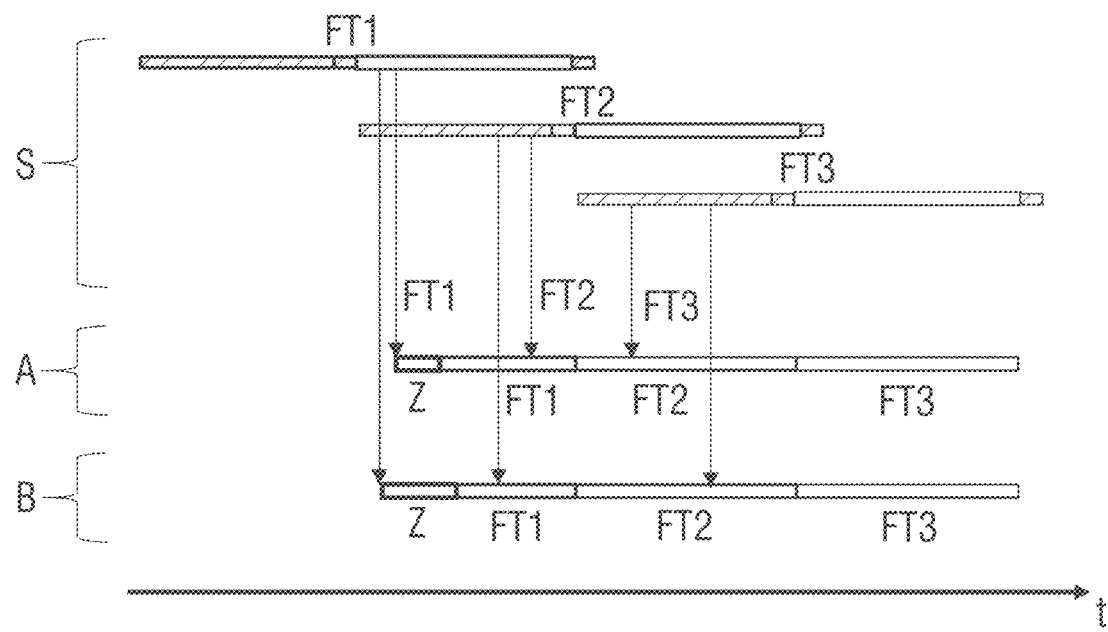

Here:

FIG. 1 schematically shows a sequence diagram of a method for anonymously transmitting data of a vehicle to a computer coupled with the latter via a data link and FIG. 2 schematically shows a time diagram of a token use.

Parts corresponding to one another are provided with the same reference numerals in all figures.

DETAILED DESCRIPTION

FIG. 1 shows a sequence diagram of a method for anonymously transmitting data D of a vehicle as a client A, B to a computer R coupled with the respective vehicle via a data link, and a time diagram of a token use is depicted in FIG. 2.

It should be made possible for clients A, B, in particular vehicles, to anonymously transmit data D to the computer R, without the computer R having the possibility of determining the identity of the respective client A, B. Nevertheless, it must be ensured that only permitted, and thus authorized clients A, B can transmit data D and that individual clients A, B can be blocked as required, for example due to a hacker attack.

In order to anonymously transmit data D from a client A, B to a computer R, a method described in the following is suggested, which additionally makes it possible to block individual clients A, B as required.

The method provides that the respective vehicle as a client, A, B makes a request F for a fleet token FT1 with client-related authentication in a token server S. The client A, B then authenticates itself with one or more client-related authentication methods, e.g., shared secret, client certificate or by means of a client-related token.

The authentication and authorization A/A of the client A, B is then checked by means of the token server S. If it is determined in the check, for example by means of a blacklist or whitelist, that the client A, B making the request F is not blocked in relation to a data transfer, the client A, B receives a currently valid fleet token FT1. This fleet token FT1 received by the corresponding client A, B is identical for all clients A, B, for example for all vehicles of a vehicle fleet, within a pre-determined period of time. This means that the fleet tokens FT1 received by the respective client A, B also do not differ with regard to expiry time and/or signature.

The client A, B in the form of a vehicle then waits for a random period of time Z within a configurable time interval before the vehicle uses the fleet token FT1 to transmit the data D to the computer R, such that a correlation between the vehicle and the transmitted data D via a time measurement can be substantially prevented.

Before a validity of the currently valid fleet token FT1 has expired, but after a new fleet token FT2 is made available by the token server S, the respective client A, B, as described above, retrieves the new fleet token FT2. The client A, B thus retrieves a new fleet token FT2 before the currently valid fleet token FT1 expires via distributed, synchronized token rotation. The currently valid fleet token FT1, however, continues to be used until a validity, and thus a usage time, of the new fleet token FT2 begins.

All clients A, B, i.e., all vehicles, which are authorized to transmit data D to the computer unit R simultaneously switch to the new fleet token FT2 at the beginning of the validity of the latter.

In FIG. 2, two clients A, B are used as examples to depict the use of fleet tokens FT1 to FT3 in relation to time t.

Here, the validity of the respective fleet token FT1 to FT3 pre-determined by means of the token server S is shown using cross-hatching.

With regard to the respective client A, B, the respective random period of time Z, which represents a waiting time, and then the use of the respective fleet token FT1 to FT3 to anonymously transmit the data D of the two clients A, B in the form of the vehicles which belong to a vehicle fleet is shown.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for anonymously transmitting data of a vehicle to a computer coupled by data links to the vehicle, wherein:
   the vehicle authenticates itself as a client, by one or more authentication methods, with a token server,
   authentication and authorization of the client is checked by the token server,
   if the token server determines that the client is not blocked, a currently valid fleet token, which is identical for all clients within a predetermined period of time, is sent to the vehicle as a client, and
   the vehicle waits for a random period of time within a configurable time interval before the vehicle uses the fleet token to transmit the data to the computer such that a correlation between the vehicle and the transmitted data via a time measurement is prevented, wherein clients are all vehicles of a vehicle fleet that are authorized to transmit data to the computer.

2. The method of claim 1, wherein the vehicle retrieves a new fleet token at a random point in time before the predetermined period of time elapses and after the new fleet token is made available by the token server, wherein the fleet token is used until a validity of the fleet token expires.

3. The method of claim 2, wherein all clients simultaneously switch to using the new fleet token at a beginning of a usage time of the new fleet token.

* * * * *